(12) United States Patent  (10) Patent No.: US 6,370,000 B1
Casey et al.                (45) Date of Patent:    Apr. 9, 2002

(54) PRIMARY TELEPHONE LINE PROTECTOR WITH FAIL SAFE

(75) Inventors: Kelly C. Casey, Flower Mound; Dennis M. McCoy, Dallas, both of TX (US)

(73) Assignee: Teccor Electronics, LP, Irving, TX (US)

( * ) Notice: Subject to any disclaimer, the term of this patent is extended or adjusted under 35 U.S.C. 154(b) by 0 days.

(21) Appl. No.: 09/546,718

(22) Filed: Apr. 11, 2000

Related U.S. Application Data

(62) Division of application No. 09/036,436, filed on Mar. 9, 1998, now Pat. No. 6,104,591.

(51) Int. Cl.$^7$ ................................. H02H 3/22
(52) U.S. Cl. ...................................... 361/119
(58) Field of Search ................ 361/103, 106, 361/111, 117, 118, 119, 120, 124, 126, 127, 105

(56) References Cited

U.S. PATENT DOCUMENTS

| | | | | |
|---|---|---|---|---|
| 3,889,221 A | * | 6/1975 | Heisinger | 337/33 |
| 4,644,437 A | | 2/1987 | Robe | 361/56 |
| 4,876,621 A | | 10/1989 | Rust et al. | 361/58 |
| 4,901,188 A | | 2/1990 | Gilberts | 361/119 |
| 4,905,119 A | | 2/1990 | Webb | 361/119 |
| 4,907,120 A | | 3/1990 | Kaczmarek et al. | 361/119 |
| 4,944,003 A | | 7/1990 | Meyerhoefer et al. | 379/412 |
| 4,958,253 A | | 9/1990 | Gilberts et al. | 361/119 |
| 4,958,254 A | | 9/1990 | Kidd et al. | 361/119 |
| 4,964,160 A | | 10/1990 | Traube et al. | 379/412 |
| 4,979,071 A | | 12/1990 | Ito et al. | 361/56 |
| 5,101,317 A | | 3/1992 | Cwirzen et al. | 361/119 |
| 5,150,271 A | | 9/1992 | Unterweger et al. | 361/119 |
| 5,155,649 A | | 10/1992 | Hung et al. | 361/119 |
| 5,166,855 A | * | 11/1992 | Turner | 361/119 |
| 5,191,605 A | * | 3/1993 | Brower | 379/332 |
| 5,224,012 A | | 6/1993 | Smith | 361/119 |
| 5,231,367 A | * | 7/1993 | Ikeda et al. | 337/28 |
| 5,276,422 A | * | 1/1994 | Ikeda et al. | 337/28 |
| 5,327,318 A | * | 7/1994 | Popat et al. | 361/103 |
| 5,334,553 A | * | 8/1994 | Popat et al. | 361/119 |
| 5,341,270 A | | 8/1994 | Kaczmarek | 361/119 |
| 5,359,657 A | | 10/1994 | Pelegris | 379/412 |
| 5,371,647 A | * | 12/1994 | Fried et al. | 361/119 |
| 5,384,679 A | | 1/1995 | Smith | 361/119 |
| 5,398,152 A | | 3/1995 | Borkowicz et al. | 361/119 |
| 5,422,779 A | * | 6/1995 | Borkowicz et al. | 361/119 |
| 5,428,494 A | | 6/1995 | Ahuja | 361/62 |
| 5,438,619 A | | 8/1995 | Shannon et al. | 379/412 |

(List continued on next page.)

OTHER PUBLICATIONS

"A Series of Physical Lead Frames Utilized by Employer of Applicant (Teccor Electronics, Inc.) to fabricate Triac Devices." No Date.

*Primary Examiner*—Ronald W. Leja
(74) *Attorney, Agent, or Firm*—Howison, Chauza, Thoma, Handley & Arnott, LLP; Roger N. Chauza

(57) ABSTRACT

A telephone line protection element constructed of three lead frames having contact fingers for holding therebetween a semiconductor cell providing overvoltage protection between the telephone line and the customer circuits. The lead frames are soldered to a resistive semiconductor material to provide a fail-safe mechanism that mechanically connects either the tip or ring telephone line conductors to ground if a sufficient overcurrent exists. In response to an overcurrent, the resistive semiconductor material generates heat and melts the solder in contact therewith, which allows a pre-bent member of the lead frame to move in contact with a ground terminal, thereby shunting the overcurrent to ground. The entire protection element includes very few components and is efficiently assembled and attached to the pins of a 5-pin module.

35 Claims, 7 Drawing Sheets

U.S. PATENT DOCUMENTS

| | | |
|---|---|---|
| 5,440,441 A | 8/1995 | Ahuja .......................... 361/62 |
| 5,488,535 A * | 1/1996 | Masghati et al. ........... 361/119 |
| 5,512,784 A | 4/1996 | Fried et al. ................. 257/724 |
| 5,523,916 A | 6/1996 | Kaczmarek ................. 361/119 |
| 5,541,804 A | 7/1996 | Frederiksen ................ 361/119 |
| 5,561,582 A | 10/1996 | Geishecker et al. ........ 361/118 |
| 5,631,797 A | 5/1997 | Chabinec et al. ............ 361/91 |
| 5,643,014 A | 7/1997 | Filus et al. ................. 439/680 |
| 5,646,812 A | 7/1997 | Hernandez, Jr. ............ 361/124 |
| 6,034,862 A * | 3/2000 | Pelosi et al. ................ 361/119 |
| 6,104,591 A | 8/2000 | Casey et al. ................ 361/119 |

\* cited by examiner

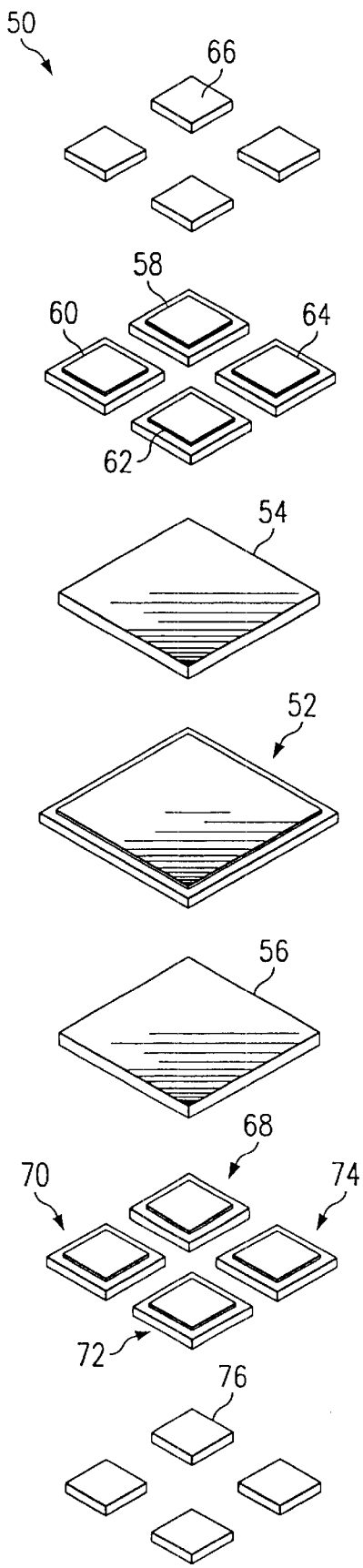
FIG. 3
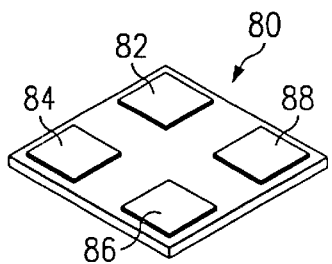
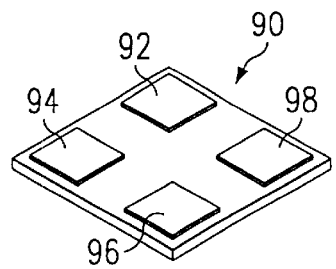
FIG. 4

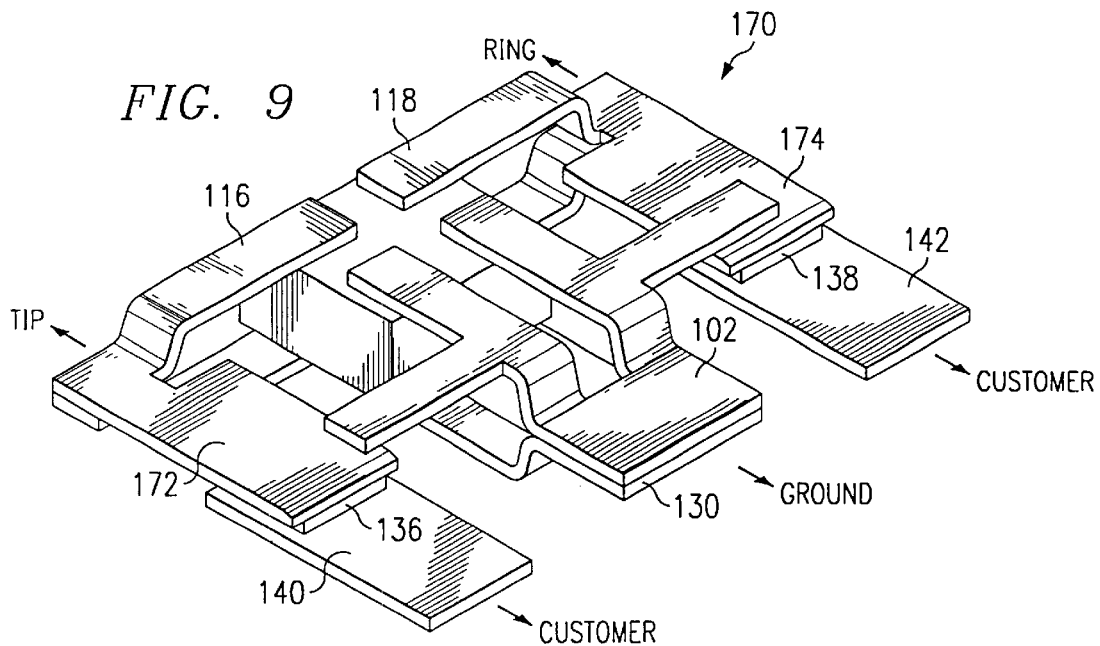
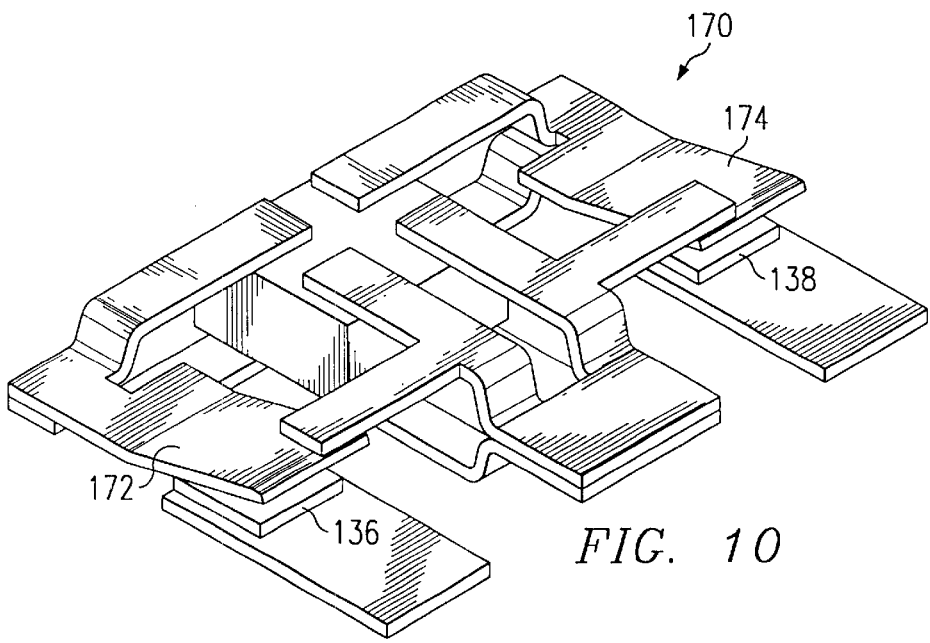

PRIMARY TELEPHONE LINE PROTECTOR WITH FAIL SAFE

RELATED APPLICATION

This is a divisional patent application of prior pending U.S. application Ser. No. 09/036,436, filed Mar. 9, 1998, now U.S. Pat. No. 6,104,591, and entitled "Telephone Line Protection Element," the entire disclosure of which is incorporated herein by reference.

TECHNICAL FIELD OF THE INVENTION

The present invention relates in general to telecommunication line protection equipment, and more particularly to fail-safe circuits and apparatus for protecting telephone lines.

BACKGROUND OF THE INVENTION

The transmission of information over the national telecommunications network involves the use of standard telephone subscriber lines and the like. One or more telephone lines extend from centralized switching systems directly to the respective telephone set, computer, answering machine, etc. in the subscriber's home, office or building. As such, that portion of the telephone line that extends outside of a building structure is exposed to the environment. Because of this environmental exposure, there exists the possibility that aerial telephone lines can be either struck by lightning or crossed with power transmission lines. Buried telephone lines can also be subjected to hazardous voltages due to excavation, trenching or digging, where equipment can cut through and cause short circuits between buried power lines and the telephone lines. It can be appreciated that overvoltages caused by lightning and power line crosses can cause catastrophic damage, not only to the telephone lines themselves, but also to the equipment connected to the telephone lines.

As a result of the foregoing hazardous conditions, specifications and standards have been established for telephone line protection devices and circuits so that if such lines come in contact with hazardous voltages, the likelihood of damage to electrical equipment connected thereto is substantially reduced. Indeed, the standard telephone line protection module includes five terminals or pins that are arranged in a particular configuration. One pair of pins is associated with the telephone tip conductor and another pair is associated with a telephone line ring conductor. The fifth terminal is connected to a ground bus. One or more overvoltage protection circuits or devices are responsive to hazardous voltages to connect either the tip or ring conductors, or both, to the ground terminal so that the apparatus connected to the telephone line is protected from exposure to the hazardous voltages or currents.

U.S. Pat. Nos. 5,101,317; 5,341,270; and 5,359,657 are illustrative of conventional telephone line protection devices. In many of the telephone line protection devices, including those identified in the above-noted patents, primary overvoltage protection is provided by fast-acting solid state devices, many of which are obtained from Teccor Electronics, Inc. of Irving, Tex. These solid state devices are often referred to as "SIDACtor®" devices, and are described more fully in U.S. Pat. No. 5,479,031 which is assigned to Teccor Electronics, Inc. Secondary or fail-safe protection is often provided by other mechanical apparatus that is part of the telephone line protection module. The fail-safe apparatus is responsive to the thermal energy generated as a result of the overvoltage condition imposed on the telephone line conductor(s). This apparatus generally involves a material having a low-temperature melting point, such as a tin-lead solder which, when subjected to a temperature that causes melting thereof, enables a spring to force a conductor bar to move and short circuit the tip and ring line conductors to the ground terminal of the module. The melting point of the solder compounds generally used may be as low as 150° F. Low-temperature melting solders are desirable because they trigger the fail-safe mechanism before extremely large currents destroy other parts or components connected to the telephone line. However, the low-temperature solder can in some instances melt due to elevated temperatures in contained cabinets and enclosures, in absence of any overvoltage being present on the telephone line conductors. This inadvertent activation is obviously undesirable.

The basic primary overvoltage protection and the fail-safe mechanism can be fabricated in a host of different variations, many of which are extremely complicated and thus expensive. Aside from the cost considerations of a mechanically complex device, the reliability is often compromised as a result of numerous mechanical and electrical components. It can be appreciated that as the number of components increase and the component complexity increases, the assembly time and cost also increase.

From the foregoing, it can be seen that a new type of telephone line protection device is needed which is designed to facilitate assembly thereof. Another need exists for an improved telephone line protection device that substantially reduces the number of components without compromising the reliability or quality thereof. Yet another need exists for a new telephone line protection device in which the protection element itself can be substantially assembled as an integral unit itself, and then attached to the 5-pin base so that the cover can be snap-locked thereto to form a module.

SUMMARY OF THE INVENTION

In accordance with the principles and concepts of the invention, an improved telephone line protection device is disclosed, of the type that overcomes or substantially reduces many of the shortcomings and problems attendant with the corresponding prior art devices. In accordance with a preferred embodiment of the invention, the protection element can be constructed using conventional semiconductor assembly line techniques. The protection element is constructed using three lead frames, each of which may be prestamped out of a spring-like conductive material, much like lead frames utilized in making multi-terminal semiconductor devices. When joined together by welding, or the like, the lead frames have spring-biased arms for capturing or holding a semiconductor cell therebetween. The semiconductor cell has contact surfaces that are electrically connected via the spring arms to the lead frames. In the preferred form, the semiconductor cell includes a SIDACtor circuit as well as diodes for providing current-sharing and steering capabilities. When fully assembled as an integral unit, the bottom lead frame of the protection element has five planar contact surfaces for either spot welding or fixed connection to the five pins of the telephone protection module. With this arrangement, very few components are required and very little manual labor is necessary in order to fully assemble the element and fix the same to the module pins.

In accordance with another embodiment, a fail-safe mechanism is employed. A semiconductor material of a specified resistivity is sandwiched between two of the lead frames by way of a high-temperature solder composition. One section of one of the lead frames is soldered to but spring-biased away from the semiconductor material. With this arrangement, when a substantial current passes through both lead frames via the resistive semiconductor material, a sufficient amount of heat is generated therein to melt the solder and cause the lead frame section to move under the influence of the spring bias away from the semiconductor material. The spring arm of the lead frame section then contacts another lead frame member, thereby providing a mechanical short circuit from one telephone line conductor to the ground terminal via the lead frame structure. Preferably, both the tip and ring lines employ separate fail-safe mechanisms so that both lines are independently protected from large currents that are considered more than transients.

As an alternative embodiment, the lead frame section having the spring biased arms can be split into two fingers so that only one finger is spring-biased while the other finger remains in contact with the semiconductor material, even after the solder has melted. With this arrangement, the tip or ring line is not open circuited to the equipment side of the protection module, but such line is nevertheless connected to ground by way of the other spring-biased finger.

BRIEF DESCRIPTION OF THE DRAWINGS

Further features and advantages will become apparent from the following and more particular description of the preferred and other embodiments of the invention, as illustrated in the accompanying drawings in which like reference characters generally refer to the same parts, components, elements or functions throughout the views, and in which:

FIG. 3 is an exploded view of the components of the semiconductor cell shown in FIG. 2;

FIG. 4 is an isometric view of monolithic diode chips which can be used instead of the discrete diode chips shown in FIG. 3;

FIGS. 9 and 10 are views of a protection element according to a third embodiment of the invention, shown in respective unoperated and operated conditions;

DETAILED DESCRIPTION OF THE INVENTION

Figure 1:
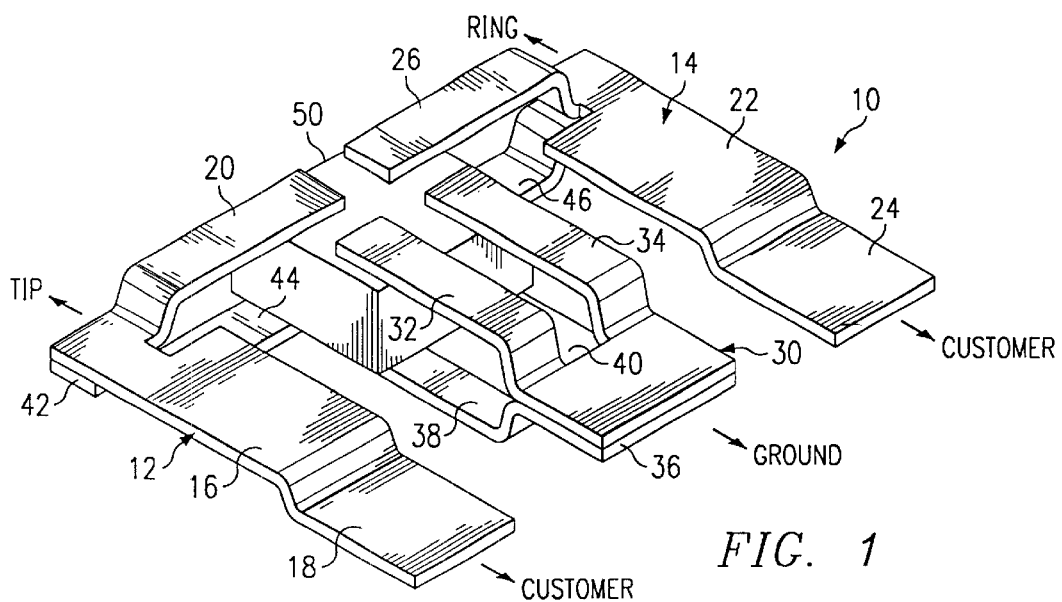
FIG. 1 is an isometric view of the protection element according to one embodiment of the invention.

With reference to FIG. 1, there is illustrated a protection element 10 constructed according to a first embodiment of the invention. According to this embodiment, two different lead frames are employed, each of which can be fabricated from a spring-like material, such as phosphor bronze or the like, much like conventional integrated circuit lead frames. Each of the lead frames can be fabricated and coiled in a roll to facilitate automatic assembly of the components to form the integral unit as shown in FIG. 1.

A top lead frame includes parts 12 and 14. The lead frame part 12 is generally stamp-cut in an "L" shape, with one arm 16 bent in a dog-leg manner to form portion 18. The bottom surface (not shown) of lead frame portion 18 functions as a contact surface of the protection element 10 for fixing to a module pin. The lead frame part 12 further includes an upwardly bent orthogonal finger 20. The other lead frame part 14 is stamp cut in a similar manner, with corresponding arm 22, portion 24 and orthogonal finger 26. The top lead frame further includes part 30 having two fingers 32 and 34. In practice, the top lead frame fingers are prebent slightly downwardly (not shown).

A bottom lead frame includes three distinct parts. A first part 36 is formed in a substantial mirror image as the top lead frame part 30. The bottom lead frame part 36 is bent, and includes two fingers 38 and 40. A second part of the bottom lead frame includes part 42 that is also bent so as to form a finger 44. A third part of the bottom lead frame includes a finger 46. The bottom lead frame fingers are prebent slightly upwardly (not shown). The bottom lead frame part 36 is spot-welded to the portion of the top lead frame 30 so as to make such parts integral. In addition, the bottom lead frame part 42 is spot-welded to the portion of the top lead frame 12 that lies directly thereabove. Lastly, the bottom lead frame part 46 is spot-welded to the top lead frame part 14. It should be appreciated that the spot-welding operations are carried out while each part of the respective lead frames are still interconnected together by web members to a tie bar (not shown) which are subsequently sheared to individualize the various parts of the respective lead frames. Also, it should be appreciated that the protection element 10 is spot-welded or otherwise fastened to the pins of the telephone line protection module prior to the shearing of the interconnecting lead frame webs.

It should be understood that while the embodiment of FIG. 1 is formed with two separate lead frames, the first and second lead frames can alternatively be formed as a single sheet of spring-like material that is stamp cut in the shape of both lead frame parts and then folded over onto itself. The folded edge becomes the connecting weld which is later removed, preferably after the welding of the top lead frame to the bottom lead frame.

Further shown in the embodiment of FIG. 1 is a semiconductor cell 50. The semiconductor cell 50 includes four top surface contacts and four bottom surface contacts, as better seen in FIG. 2. Importantly, the semiconductor cell 50 need not be fully packaged or encapsulated in a conventional manner, but need only be sufficiently passivated against the environment to allow the electrical contact surfaces to be exposed. The semiconductor cell 50 is held within the two lead frames as shown in FIG. 1, with the fingers of the respective top and bottom lead frames being spring biased against the contact surfaces of the semiconductor cell 50.

The undersurface of the bottom lead frame part 42 is spot-welded or otherwise connected to a pin associated with the telephone line tip conductor. The undersurface contact of the top lead frame part 18 is connected to the customer equipment. The undersurface contact of the bottom lead frame part 46 is connected to the telephone line ring conductor, while the undersurface contact of the top lead frame part 24 is connected to the customer equipment. The undersurface contact of the bottom lead frame part 36 is connected to circuit ground. With this arrangement, if high voltage energy is inadvertently coupled to the telephone line tip conductor, the semiconductor cell 50 will sense the same and be driven rapidly into conduction to thereby shunt the fault current of both the telephone tip and ring conductors to the ground terminal. If an excessive voltage is coupled to the telephone line ring conductor, the semiconductor cell 50 will rapidly conduct to again shunt the current carried by the tip and ring conductors to the ground terminal. In this manner, the customer equipment connected to the top lead frame parts 18 and 24 will not experience a sustained excessive voltage, and will thereby be protected.

Figure 2:
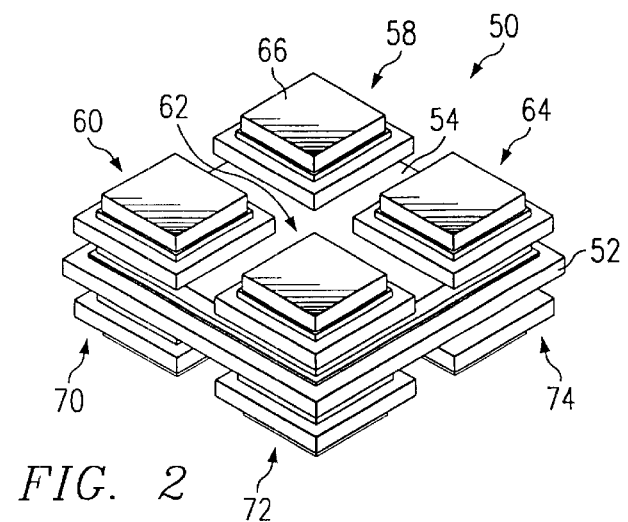
FIG. 2 is an isometric view of a composite semiconductor cell providing high speed overvoltage protection between the tip and ring lines and the ground terminal.

With reference now to FIGS. 2 and 3, there are illustrated the details of the structural features of the semiconductor cell 50. The SIDACtor® circuit itself is formed in the intermediate semiconductor layer identified by reference numeral 52. The SIDACtor circuit is essentially an undirectional switch, much like an SCR, but with a large forward gate voltage, such as about 300 volts. Deposited or otherwise formed on the top surface of the SIDACtor wafer 52 is a conductive surface layer 54, preferably of a highly conductive material such as copper. Deposited or otherwise formed on the bottom surface of the SIDACtor wafer 52 is a bottom conductive layer 56. The conductive layers 54 and 56 provide connections to the cathode and anode elements of the SIDACtor circuit formed within the semiconductor wafer 52. Four large-current diodes, shown as individual silicon chips 58, 60, 62 and 64, are electrically connected to the top conductive layer 54. A bottom contact (not shown) of each diode is soldered to the contact layer 54. During the reflow soldering process, the surface tension of the solder tends to self-align each diode chip at the respective corner of the contact layer 54. A top contact 66 of the diode 58 is connected to the diode anode. Indeed, the top contact of each of the top diodes 58–64 is connected to the anode of the respective diode.

Four other diodes 68, 70, 72 and 74 (FIG. 3) are electrically attached to the bottom contact layer 56. A respective metal contact 76 provides a bottom contact to the diode 68 in order to provide electrical connections to the lead frame. With respect to each bottom diode 68–74, the respective contact 76 is connected to the cathode of each such diode, while the anode thereof makes contact to the bottom contact layer 56.

Figure 5:
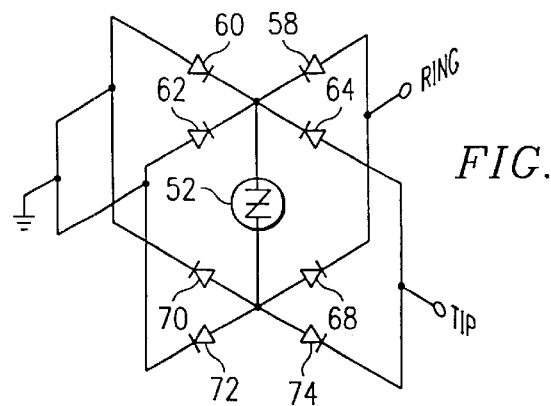
FIG. 5 is an electrical schematic diagram of the semiconductor cell of FIG. 2.

An electrical schematic drawing of the SIDACtor device 52 as well as the respective diodes is shown in FIG. 5. If a positive polarity voltage that exceeds the threshold of the SIDACtor device 52, which may be 300 volts or so, appears on the telephone ring conductor, that is connected to the top lead frame part 12, then the following action occurs. The current generated by the overvoltage will flow through diode 58, through the SIDACtor device 52, and splits through diodes 70 and 72 and to ground via the lead frame parts 30 and 36. On the other hand, if the overvoltage on the ring lead is of a negative polarity, then current will flow through the ground terminal, through diodes 60 and 62, the SIDACtor device 52, the diode 68 to the telephone line ring conductor. A worst case condition exists if an excessive voltage is coupled to both the tip and ring line conductors. If, for example a positive voltage is coupled to both the tip and ring conductors, then respective currents will flow through both top diodes 58 and 64, through the SIDACtor device 52, and then through the bottom diodes 70 and 72. It can be seen that by utilizing eight diodes, current splitting occurs when excessive voltages are coupled to both the tip or ring line conductors. This allows the various diodes to be of a smaller size to accommodate the current that is split therebetween.

As noted above, if an overvoltage exists on one of the telephone line conductors, the semiconductor cell 50 will conduct and clamp the other telephone line conductor to a low voltage, on the order of less than about five volts. In the example above, when a large positive voltage exists on the telephone line ring conductor, the forward biased diodes 58, 70 and 72 conduct, as does the SIDACtor 52. The forward voltage of each semiconductor device may be on the order of one or two volts. If a positive voltage exists on the telephone line tip conductor, then diode 64 will additionally be forward biased, thereby pulling the telephone line tip conductor down to several volts above the ground potential. The same analysis applies when large voltages are applied to the telephone line tip conductor, whereby the ring conductor is clamped to a low voltage.

While FIGS. 2 and 3 illustrate the construction of the semiconductor cell 50 utilizing discreet silicon diode chips, the cell can also be fabricated utilizing monolithic diodes formed in a single wafer, such as shown in FIG. 4. Here, a top diode wafer 80 has formed therein four respective diodes 82, 84, 86 and 88. A bottom monolithic wafer 90 includes four other diodes 92, 94, 96 and 98. The monolithic wafers 80 and 90 would have diodes poled in the same manner described in connection with FIG. 3 and soldered or otherwise electrically bonded to the respective contact layers 54 and 56. In addition, the top metal contacts 66 and the bottom metal contacts 76 would be soldered to the respective diode surfaces of the monolithic wafers 80 and 90. Again, during reflow soldering of the monolithic wafers to the contact layers 54 and 56, the surface tension tends to self-align the parts together. Importantly, in fabricating the various components of the semiconductor cell 50, a high-temperature solder is utilized so that melting does not occur during conduction of the current resulting from the telephone line overvoltage.

Figure 6:
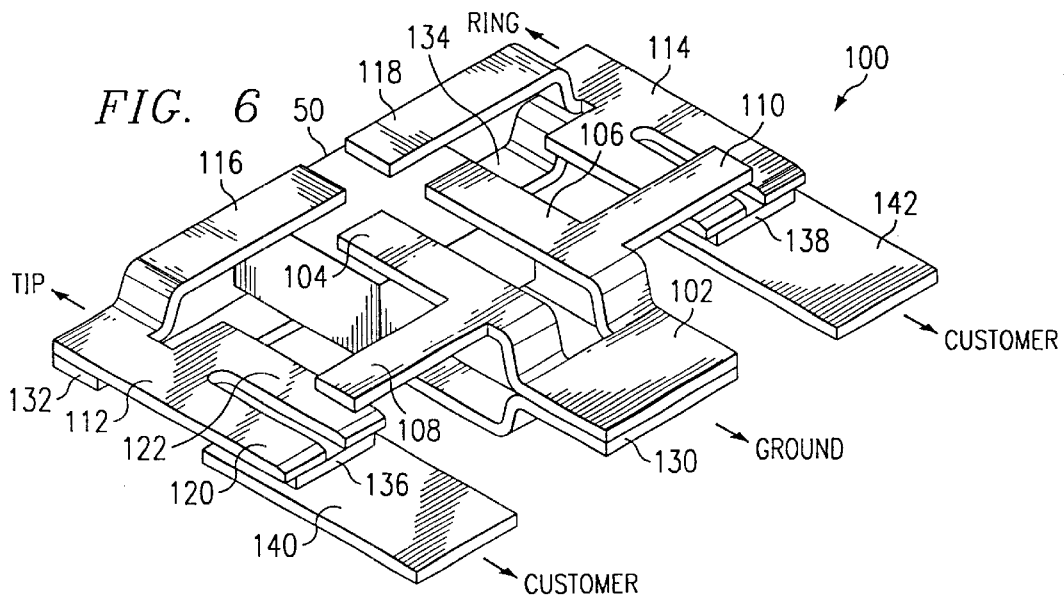
FIG. 6 is an isometric view of a protection element according to a second embodiment of the invention.
Figure 7:
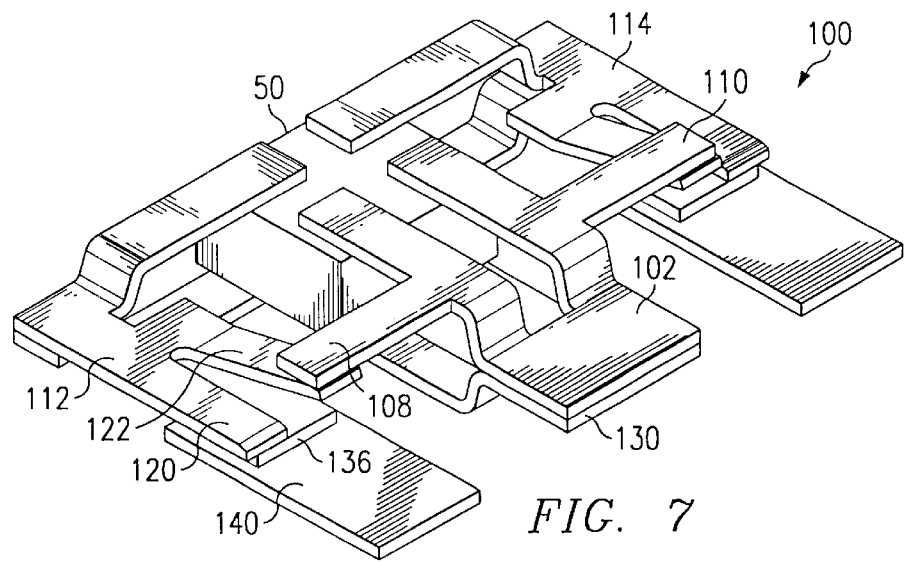
FIG. 7 is an isometric view of the protection element of FIG. 6, but in a condition in which the split finger is spring biased to short circuit a telephone line conductor to ground, while yet preventing open circuiting thereof.
Figure 8:
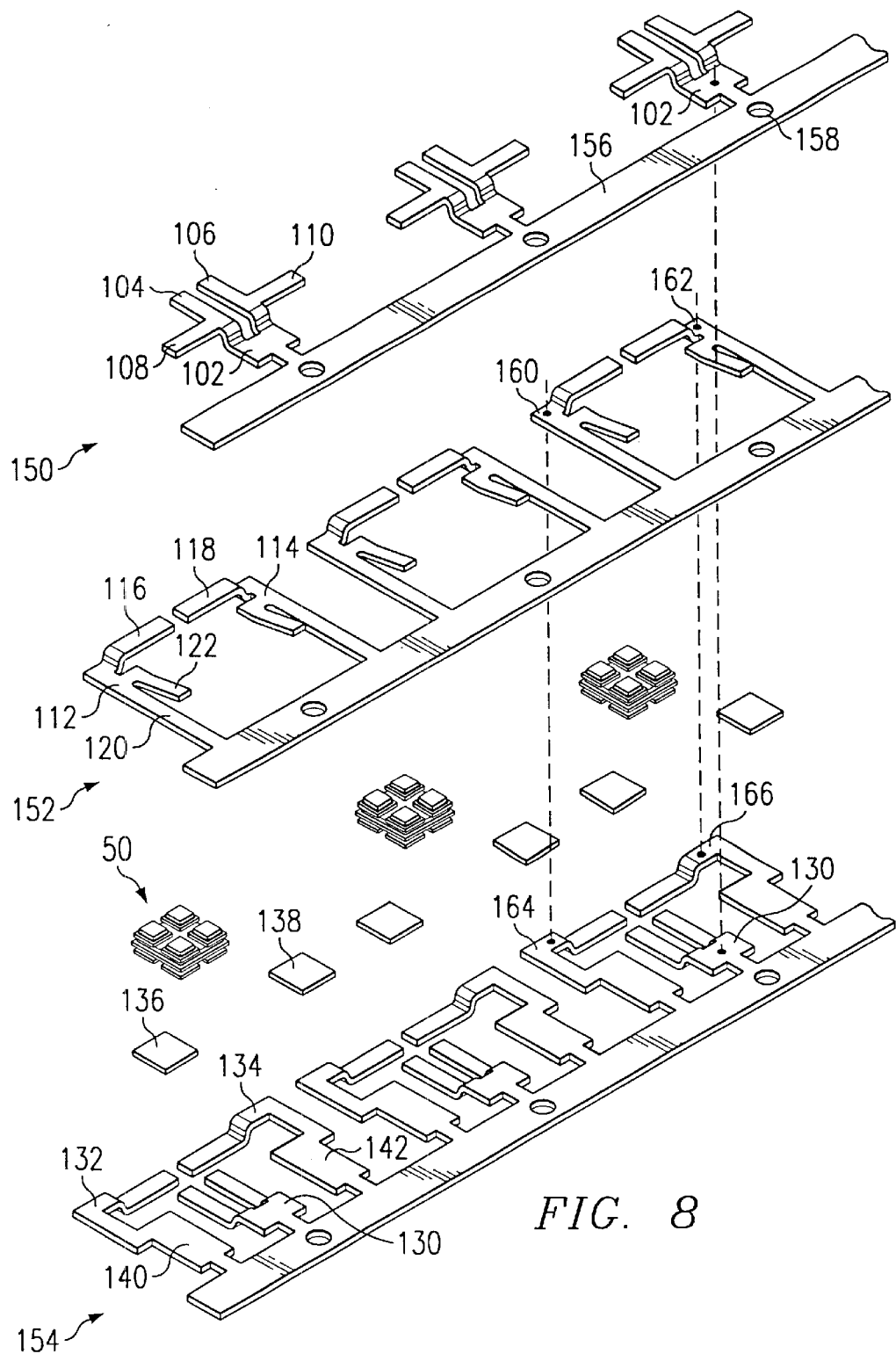
FIG. 8 illustrates by way of an exploded view, the three lead frames and the semiconductor devices employed to construct the protection element shown in FIG. 6.

FIGS. 6 and 7 illustrate another embodiment of the protection element utilized in providing overvoltage protection for telephone lines. For clarity, the individual lead frames are shown in FIG. 8. A top lead frame 150 includes the part 102 having a first arm 104 and a second arm 106. Moreover, each arm 104 and 106 has a respective lateral arm 108 and 110. The terminal ends of the arms 104 and 106 make contact to the respective top diodes of the semiconductor cell 50. A middle lead frame 152 includes two parts 112 and 114. Each part has a respective lateral arm 116 and 118 providing contact to two other respective top diodes of the semiconductor cell 50. In addition, each middle lead frame part 112 and 114 includes a pair of split fingers 120 and 122. As will be described more fully below, the one split arm 120 is shaped in a straight, linear manner, while the other split arm 122 is formed so as to be prebent in an upwardly direction.

A bottom lead frame 154 includes a first part 130 that is spot-welded to the top lead frame part 102. The bottom lead frame part 130 includes two contact fingers that contact two bottom diodes of the semiconductor cell 50. A second part 132 of the bottom lead frame 154 is welded at the corner of the element to the middle lead frame part 112. Similarly, a third part 134 of the bottom lead frame 154 is welded at the corner to the middle lead frame part 114. The terminal ends of each of the split fingers 120 and 122 of the middle lead frame parts 112 and 114 are soldered to respective semiconductor material blocks 136 and 138. The bottom surface of each semiconductor material block 136 and 138 is soldered to respective parts 140 and 142 of the bottom lead frame 154.

In accordance with an important feature of the invention, the prebent split finger 122, together with the semiconductor material block 136 and the lateral arm 108 of the top lead frame part 102 provide a fail-safe mechanism for short circuiting the telephone line tip conductor to ground. The fail-safe mechanism can become operational in the event of either a failure of the semiconductor cell 50, if the cell does not conduct because the overvoltage on the telephone line does not exceed the threshold voltage of the cell 50, or if for whatever reason the cell temperature becomes sufficiently high. The protection element 100 is constructed with appropriate thermal paths from the semiconductor cell 50 to the resistive semiconductor blocks 136 and 138. The thermal paths include the middle and bottom lead frame fingers that clamp the cell 50 in place, where the fingers have a sufficient cross-sectional area to collectively conduct an amount of thermal energy sufficient to melt the solder between the split finger 122 and the resistive semiconductor block 136. The thermal path includes the other split finger and associated resistive block 138. In practice, the resistive blocks 136 and 138 are soldered to the underlying lead frames with a solder composition that melts at a temperature of about 180° C., while a different solder composition is employed for soldering the resistive blocks to the split fingers. Preferably, the resistive blocks are soldered to the top split fingers of the middle lead frame with a solder that melts at a much lower temperature, such as about 70° C. With this arrangement, the resistive blocks 136 and 138 remain fastened to the bottom lead frame parts even though the thermal energy of the resistive block causes the solder on top thereof to melt and release the prebent split fingers 122 of the middle lead frame.

In the event that the thermal energy generated by large currents conducted through the semiconductor cell 50 causes the silicon material thereof to melt, the top and bottom prebent lateral arms (such as arm 116) force the top and bottom metallic parts of the semiconductor cell 50 together into a short circuited condition. Stated another way, the lateral arms "crush" the melted parts of the semiconductor cell 50 together so that even if the electrical circuit therein is destroyed by the overcurrent, the cell structure maintains a conduction path therethrough, whereby the telephone line conductors remain short circuited to ground, albeit permanently, until the semiconductor cell is replaced.

The semiconductor material block 136 comprises either P-type or N-type doped material of a predefined thickness, such as ten mils. The overall bulk resistivity of the semiconductor material is selected to be preferably about 4.0 ohm *cm, which together with the dimensional constraints of the block provide the desired thermal performance. The particular size or surface area of the wafer can be determined based on the bulk resistivity and the requirements of a specified carry current and operate current. As can be appreciated, the thermal energy generated by current passing through the resistance in the semiconductor material block 136 should not melt the solder thereon when carrying the rated carry current. However, when a higher magnitude current, called an operate current, is passed through the semiconductor material block 136, then a sufficient amount of heat is generated to cause melting of the solder. When the solder melts, the pre-bent finger 122 springs upwardly and makes contact with the lateral arm 108 of the top lead frame part 102. This essentially causes a short circuit between the telephone tip line and ground. The pre-bent spring finger associated with the middle lead frame part 114 operates similarly in response to the thermal energy generated by the semiconductor material block 138. The other split finger 120 of the middle lead frame part 112 functions to maintain an electrical connection between the telephone line tip conductor and the customer equipment. Even though the thermal energy generated by the semiconductor material block 136 may have melted the solder, the split finger 120 maintains the semiconductor material 136 sandwiched to part 140 of the bottom lead frame 154. The stationary split finger associated with the other middle lead frame part 114 functions in a similar manner.

With reference to FIG. 7, there is illustrated the protection element 100 in a state in which the split finger 122 has been released from its solder connection, thereby connecting the lateral arm 108 to ground via the bottom lead frame part 130. As can be seen, current caused by an overvoltage on the telephone line tip conductor flows through the middle lead frame part 112, through the up-turned split finger 122, the lateral arm 108 of the top lead frame part 102, and to ground. In this embodiment, continuity is maintained between the telephone line tip conductor and the customer equipment by way of the nonmovable split finger 120. In accordance with an important feature of the invention, no separate or additional spring(s) is required in order to mechanically move electrical contacts to achieve the fail-safe operation. This is in sharp contrast with the prior art devices where not only are additional components required, but additional assembly time is needed in order to fabricate the protection device.

FIG. 8 illustrates the various components of each lead frame and the relative positions thereof during assembly of the protection element 100. Shown is the top lead frame 150, the middle lead frame 152 and the bottom lead frame 154, with the various parts of each of the lead frames identified with reference numerals corresponding to those shown in FIG. 6. As is conventional, each lead frame, such as the top lead frame 150, includes a tie bar 156 for supporting the various elements, components or parts thereof together. Each tie bar 156 includes pilot holes 158 through which a common pin is placed to register each lead frame with respect to the others. Each protection element can be assembled manually, or by automated processes that are well-known in the art. According to an important feature of the invention, the entire protection element is comprised simply of a top, middle and bottom lead frame component, together with the semiconductor cell 50 and a pair of semiconductor material blocks 136 and 138. The assembly is further facilitated due to the use of lead frames, in that an assembly fixture can be utilized with fixed pins for registering the various lead frames thereon. A boat, or other depressed area formed in the fixture can hold the semiconductor material blocks 136 and 138 therein for registering with the lead frames. Lastly, another depressed area can be formed in the assembly fixture for holding the semiconductor cell 50 therein, again for registering the cell with regard to the metal parts of the lead frame.

The assembly of the protection element 100 can be accomplished in the following manner. In a first fixture, the semiconductor material blocks 136 and 138 can be soldered in a reflow process to the undersurfaces of the split fingers 120, 122 and the other split fingers associated with the middle lead frame part 114. During this process, the prebent fingers 122 are maintained against the top surface of the respective semiconductor material blocks 136 and 138. Then, the bottom lead frame 154 is placed in a fixture on the registration pins, with the semiconductor cell 50 situated in a well so as to be registered on top of the four arms. The middle lead frame 152 with the semiconductor material blocks 136 and 138 soldered thereto is then placed in the fixture in registration with the bottom lead frame 154. Next, the top lead frame 150 is placed into the fixture, again in registration with the middle lead frame 152 and the bottom lead frame 154. Spot-welds by DC or AC equipment are accomplished between the lead frames as shown by the broken lines in FIG. 8. More particularly, the corners 160 and 162 of the middle lead frame 152 are welded to the corresponding corners 164 and 166 of the bottom lead frame 154. Lastly, the down-turned part 102 of the top lead frame 150 is welded to the up-turned part 130 of the bottom lead frame 154.

Once the lead frames have been assembled and attached together in the manner noted above, the webbing of the lead frames can be cut by a stamp machine to separate the parts thereof, as well as to separate the parts from the tie bars 156. Lastly, the individual protection elements can then be tested to verify the functionality thereof. While FIG. 8 illustrates three protection elements during assembly, many other protection elements can be assembled simultaneously on a fixture formed to accommodate the specified number of elements.

Figure 11:
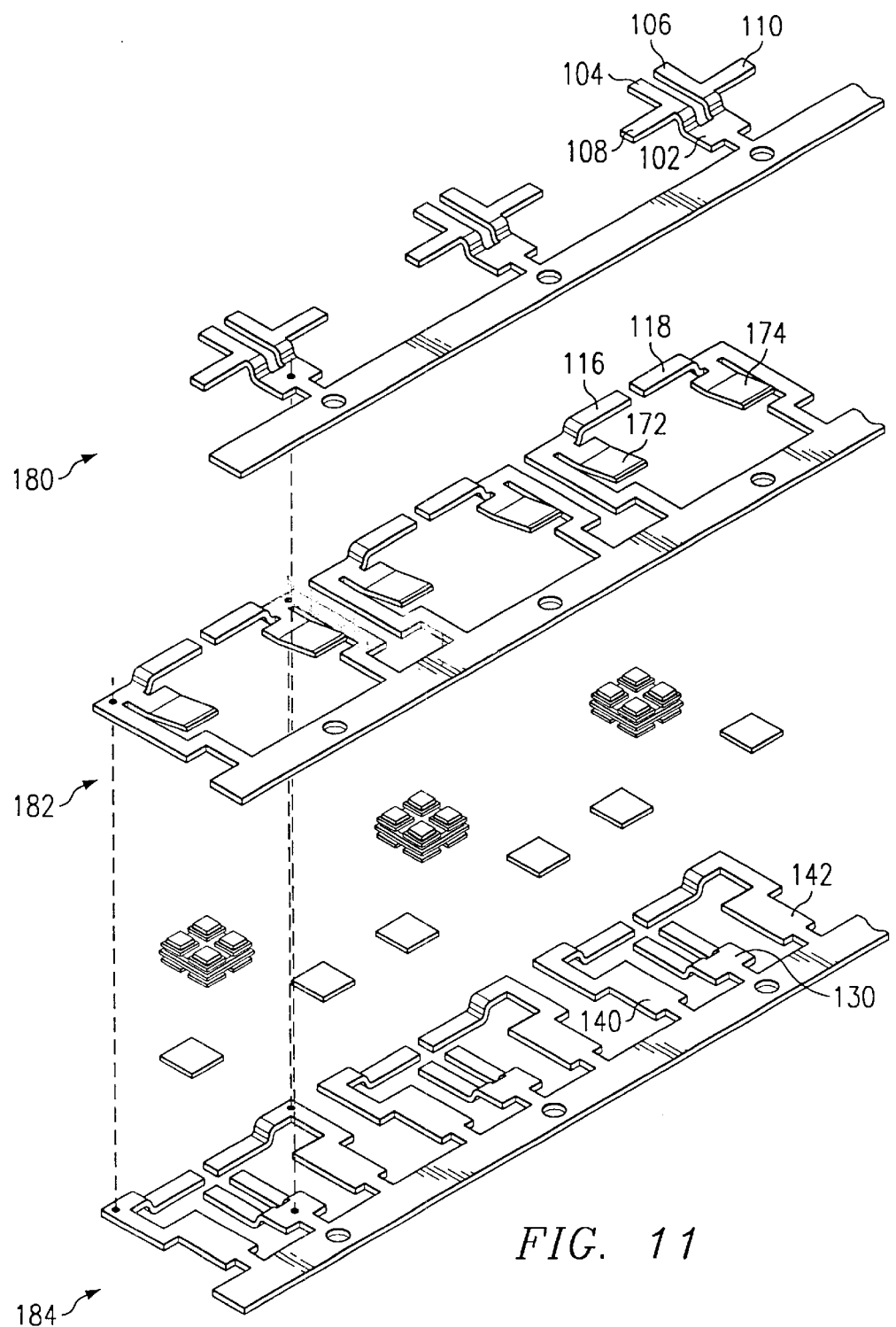
FIG. 11 illustrates by way of an exploded view the three lead frames utilized in constructing the protection element shown in FIG. 9.

FIGS. 9 and 10 depict yet another embodiment of the invention. The lead frames are shown in FIG. 11. Here, the protection element 170 is similar to that shown in FIGS. 6 and 7, but is constructed to provide an open circuit in a fail-safe mode between the telephone line tip and ring conductors and the respective customer terminals. In FIG. 9, the protection element 170 is shown in the unoperated state where the tip and ring conductors are connected to the corresponding customer terminals. In FIG. 10, the protection element 170 is shown operated, wherein the pre-bent fingers are moved to a position to thereby short circuit the tip and ring to ground. In this instance, the tip and ring conductors are open circuited with respect to the customer terminals.

This embodiment is achieved by bending each finger 172 and 174 of the middle lead frame 182 upwardly during fabrication thereof from the metal stock. Although the middle lead frame fingers 172 and 174 are soldered to the respective semiconductor material blocks 136 and 138, such fingers are spring biased to move upwardly, as shown in FIG. 10, when a sufficient amount of heat is generated by the semiconductor material blocks 136 and 138. While both fingers 172 and 174 are shown operated in FIG. 10, each such finger operates only when a sufficient amount of heat is generated by current flowing through the respective semiconductor material block 136 or 138.

FIG. 11 illustrates the structure of the lead frames for fabricating the protection element 170. A top lead frame 180, a middle lead frame 182 and a bottom lead frame 184 are utilized in constructing the element 170. In comparing the lead frames between FIGS. 8 and 11, it is noted that only the middle lead frames 152 and 182 are different in the fabrication of the different elements. Otherwise, the assembly operation is substantially identical.

While the protection element embodiments shown in FIGS. 6–10 employ semiconductor resistive blocks 136 and 138, the use thereof is not a necessity in the utilization of the invention. Rather, if secondary protection is not needed, a metallic plug can be substituted for the semiconductor blocks, whereby no heat will be generated and no secondary fail-safe operation will be provided. Moreover, resistive materials other than semiconductor wafers can be utilized, such as discreet resistor components and other resistive parts.

Figure 12:
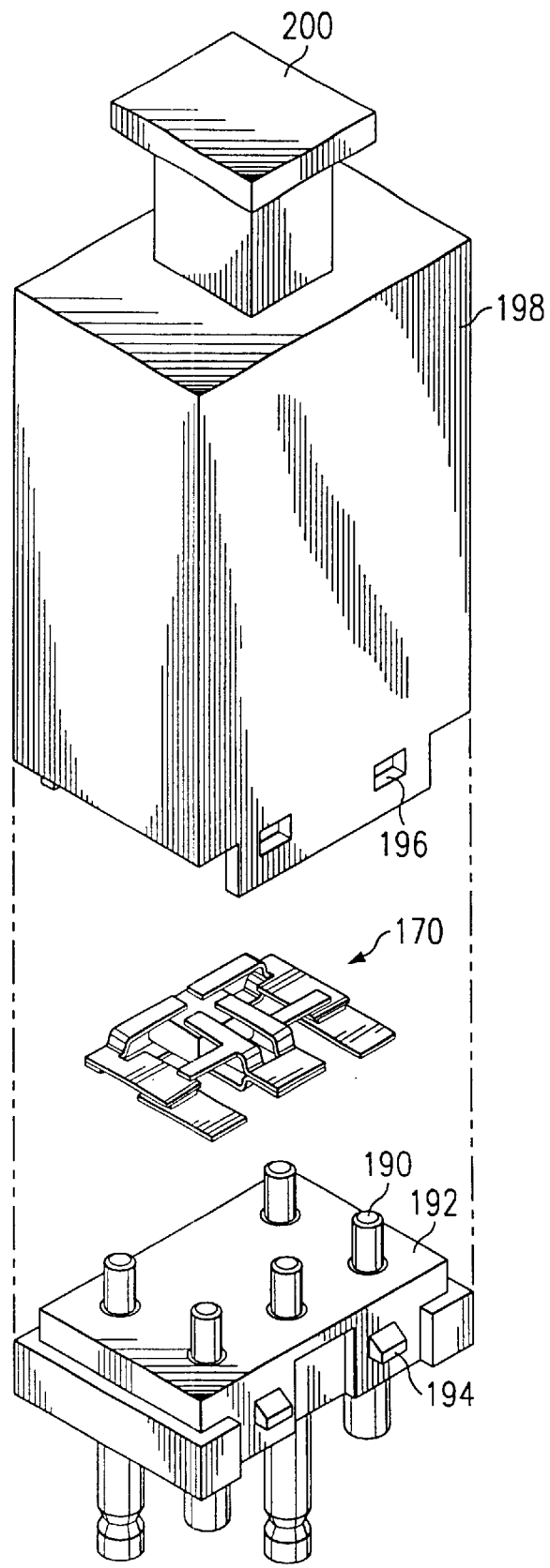
FIG. 12 is an exploded view of a telephone line protection module that includes a base, the protection element and the module cover.

FIG. 12 illustrates in exploded form the various components of the telephone line protection module. In comparing the module shown in FIG. 12 with the prior art devices, it is noted that there is a significant difference in complexity. As such, the telephone protection device constructed according to the principles and concepts of the invention includes fewer components and thus is less costly, more reliable and can be made more efficiently.

As noted above, the contact surfaces on the bottom of the lead frame of the protection element 170 are all planar surfaces and oriented in a common plane. As such, the protection element 170 can be spot-welded to the top flat surfaces 190 of the pins, as shown in FIG. 12. While the module is shown in connection with the protection element 170, the other protection elements 10 or 100 can also be utilized. The protection module includes the standard 5-pin configuration, where each pin is fixed within a plastic base 192. Each pin can be press-fit, crimped or otherwise fastened so as to prevent axial movement within the base 192. The base 192 includes engaging ears 194 on each side for snap-fitting into corresponding openings 196 formed within a plastic cover 198. The cover 198 includes a conventional finger pulltab 200 for allowing easy insertion and removal of the telephone line protection module from a socket (not shown). As can be appreciated, the module is fabricated of a standard size and shape so as to be pluggable into existing sockets that are wired to telephone tip and ring conductors, the customer lines, as well as a ground connection.

In the preferred embodiments described above, the lead frames are stamped and otherwise formed so as to provide contact surfaces that are spot welded to the terminal pins of the module base. However, those skilled in the art may prefer to form contacts of the protection element that are barrel-shaped and split so as to be friction fit when pushed onto the terminal pins of the module base. Other contact configurations are also possible.

While the preferred and other embodiments have been disclosed with reference to a specific telephone line protection module, and methods of construction thereof, it is to be understood that many changes in detail may be made as a matter of engineering choices, without departing from the spirit and scope of the invention, as defined by the appended claims.

What is claimed is:

1. A communication line protection device, comprising:
   first and second input/output terminals;
   a ground terminal;
   an overvoltage protection device operatively connected to the first input/output terminal, the second input/output terminal, and the ground terminal so that at least one of the first and second input/output terminals connects to the ground terminal in a high voltage condition;
   a first fail-safe mechanism including a first member and a second member, said first member formed of spring material that is spring-tensioned when bonded to said second member, said spring material of said first member arranged to connect the first input/output terminal to ground when a temperature of the first fail-safe mechanism exceeds a threshold temperature; and
   a second fail-safe mechanism adapted to connect the first and second input/output terminals to the ground terminal upon thermal destruction of the overvoltage protection device.

2. The communication line protection device of claim 1, wherein the first fail-safe mechanism comprise said first member, wherein the first member formed of spring material includes a portion that is biased to move into a position connecting the first input/output terminal to the ground terminal when the bond releases.

3. The communication line protection device of claim 2, wherein the biased portion of the first member includes a pre-bent finger.

4. The communication line protection device of claim 2, wherein the first member includes a second portion that remains in electrical contact with the second member above the threshold temperature.

5. The communication line protection device of claim 1, wherein the first fail-safe mechanism is further arranged to connect the first input/output terminal to ground when an operate current through the first input/output terminal heats the first input/output terminal above the threshold temperature.

6. A communication line protection device providing overvoltage protection to a communication line, comprising:
  a first communication line terminal and a second communication line terminal;
  a solid state overvoltage protection device having contacts;
  a line conductor assembly connected between said first communication line terminal and said second communication line terminal, said line conductor assembly including spaced-apart arm members holding in compression therebetween said solid state overvoltage protection device, and said spaced-apart arm members providing an electrical connection to a first contact of said solid state overvoltage protection device; and
  a ground conductor assembly providing an electrical connection to a second contact of said solid state overvoltage protection device, such that signal currents are conducted between said first communication line terminal and said second communication line terminal until said solid state overvoltage protection device is triggered into conduction by an overvoltage between one of said first and second communication line terminals and said ground conductor assembly, whereupon the communication line terminal that experiences an overvoltage is electrically connected to said ground conductor assembly by said solid state overvoltage protection device.

7. The communication line protection device of claim 6, wherein said solid state overvoltage protection device comprises a semiconductor chip that is not encapsulated, so that when the semiconductor material of said semiconductor chip melts due to its temperature being raised by current passing therethrough, the compression exerted thereon by said spaced-apart arm members causes said semiconductor chip to become crushed.

8. The communication line protection device of claim 7, wherein said semiconductor chip is constructed with opposing face surfaces, each face surface having at least one said contact, and said semiconductor chip is further constructed so that when crushed, an electrical short circuit exists between said contacts on the opposing face surfaces.

9. The communication line protection device of claim 6, wherein said line conductor assembly includes a conductive sheet material having a biased finger bonded by a thermal sensitive bonding agent in one position, such that when said bonding agent releases said biased finger moves into contact with said ground conductor assembly.

10. The communication line protection device of claim 9, wherein the line conductor assembly further includes a resistive material through which current flows between said first communication line and said second communication line, and wherein said biased finger is bonded with said bonding agent to said resistive material.

11. The communcation line protection device of claim 6, wherein said solid state overvoltage protection device includes first contacts on one face surface thereof, and second contacts on an opposing face surface thereof, and wherein said spaced-apart arm members of said line conductor assembly compressively contact respective ones of said first and second contacts of said solid state overvoltage protection device.

12. The communication line protection device of claim 6, wherein said line conductor assembly comprises conductive sheet material, and the arm members extend from said conductive sheet material, and said ground conductor assembly comprises conductive sheet material having spaced apart arm members holding in compression therebetween said solid state overvoltage protection device.

13. The communication line protection device of claim 12, wherein said line conductor assembly further includes a biased arm extending therefrom, said biased arm being initially held in a first position not contacting said ground assembly and being constructed and arranged to move to a second position contacting said ground assembly when a temperature of said line conductor assembly exceeds a threshold temperature.

14. The communication line protection device of claim 13, wherein said biased arm comprises prebent conductive sheet material.

15. The communication line protection device of claim 13, wherein said biased arm is bonded in the first position by a thermal sensitive bonding agent such that when a current through the line conductor assembly raises the temperature of the bonding agent above the threshold temperature said bonding agent releases and said biased arm moves to the second position.

16. The communication line protection device of claim 12, wherein said line conductor assembly includes a resistive semiconductor block connected between first and second parts of said line conductor assembly, said first part being electrically coupled to said first communication line terminal and said second part being electrically connected to said second communication line.

17. The communication line protection device of claim 16, wherein one of said first and second parts is biased and is bonded to said semiconductor block with a bonding agent that releases in response to a predetermined temperature, such that said one of said first and second parts moves away from said semiconductor block, interrupting current flow between said first and second parts.

18. The communication line protection device of claim 17, wherein said bonding agent comprises solder.

19. The communication line protection device of claim 6, wherein the line conductor assembly includes a switch responsive to current exceeding a predefined magnitude for interrupting current flow between said first and second communication lines.

20. A communication line protection device providing electrical protection to a communication line, comprising:
  a communication line assembly including first and second conductors connected respectively to first and second terminals of the communication line, and a switch between the first and second conductors having a movable contact in a normally closed circuit position in which current can flow between said first and second terminals through said first and second conductors, said movable contact of said switch comprising a biased member held in a first position by a heat-sensitive bond, said biased member including a prebent portion of one of the first and second conductors, and wherein said biased member moves to a second position open circuiting the first terminal and the second terminal when said heat-sensitive bond releases the biased member in response to heat;

a resistive semiconductor material in electrical connection in the first position between the biased member and the other of the first and second conductors so that when said resistive semiconductor material generates heat in response to current passing therethrough, said heat-sensitive bond releases the biased member so that said switch operates to connect at least one of said first and second conductors to a ground; and an overvoltage protection device in electrical connection with the communication line assembly and with the ground, said overvoltage protection device being responsive to a voltage above a threshold voltage for electrically connecting at least one said first and second conductors to the ground.

21. A communication line protection device providing electrical protection to a communication line, comprising:

a ground;

a communication line assembly including first and second conductors connected respectively to first and second terminals of the communication line, and a switch between the first and second conductors having a movable contact in a normally closed circuit first position in which current can flow between said first and second terminals through said first and second conductors, said switch responsive to a temperature exceeding a predefined magnitude caused by current flowing therethrough for moving said movable contact to a second position in which at least one of said first conductor and said second conductor is connected to the ground; and an overvoltage protection device in electrical connection with the communication line assembly and with the ground, said overvoltage protection device being responsive to a voltage above a threshold voltage for electrically connecting at least one said first and second conductors to the ground.

22. The communication line protection device of claim 21, wherein said switch is structured so that both the first and said second conductors are connected to the ground in the second position.

23. The communication line protection device of claim 21, wherein said switch is structured so that the first and second conductors remain electrically connected together when said switch is in the second position.

24. The communication line protection device of claim 21, wherein said switch is structured so that the first and second conductors are open circuited in the second position.

25. The communication line protection device of claim 21, wherein said switch includes a prebent, biased portion of one of the first and second conductors.

26. The communication line protection device of claim 25, wherein the one of the first and second conductors comprises a conductive sheet spring material.

27. The communication line protection device of claim 26, wherein the conductive sheet spring material is constructed to include split fingers, one of which is formed to define the prebent, biased portion.

28. The communication line protection device of claim 26, wherein the prebent, biased portion is bonded by a thermally sensitive agent to a resistive material through which current flows between said first and second conductors, such that when the current heats the resistive material above a threshold temperature, said thermally sensitive agent releases said prebent, biased portion to move to the second position into contact with the ground.

29. The communication line protection device of claim 21, further including a second communication line assembly similarly constructed to the first mentioned communication line assembly for providing protection to a second communication line, thereby forming a five-pin module.

30. A communication line protection device providing overvoltage protection to a communication line, comprising:

a first communication line and a second communication line;

an overvoltage protection device having opposing face surfaces, with at least one electrical contact formed on each said opposing face surface;

a line conductor assembly having spaced-apart arm members for holding in compression therebetween said overvoltage protection device, said spaced apart arm members each contacting one said contact of said overvoltage protection device;

a conductive ground assembly having spaced-apart arm members for holding in compression therebetween said overvoltage protection device, each arm of said conductive ground assembly contacting a respective contact of said overvoltage protection device;

said overvoltage protection device being responsive to a voltage exceeding a predefined threshold for electrically connecting said line conductor assembly to said conductive ground assembly; and a switch including a prebent arm constructed integral with said line conductor assembly, said prebent arm having a movable member responsive to thermal energy for moving from a first position to a second position, in said second position said movable member contacts said conductive ground assembly.

31. The communication line protection device of claim 30, wherein said prebent arm is bonded in said first position with a bonding agent that releases in response to a predefined temperature.

32. The communication line protection device of claim 31, wherein said line conductor assembly includes two conductors, each conductor connected to a respective said communication line, and further including a resistive material fixed to one said conductor, and said resistive material bonded to the other said conductor with said bonding agent, such that when said bonding agent reaches said predefined temperature said bonding agent releases and said prebent arm moves into contact with said conductive ground assembly, such that at least one said communication line becomes connected to said conductive ground assembly.

33. The communication line protection device of claim 32, wherein said line conductor assembly and said conductive ground assembly are constructed such that an electrical connection remains between said first and second communication lines via said resistive material after said prebent arm has moved into contact with said conductive ground assembly.

34. A communication line protection device, comprising:

first and second input/output terminals;

a ground terminal;

an overvoltage protection device operatively connected to the first input/output terminal, the second input/output terminal, and the ground terminal so that at least one of the first and second input/output terminals connects to the ground terminal in a high voltage condition;

a first fail-safe mechanism arranged to connect the first input/output terminal to ground when a temperature of the first fail-safe mechanism exceeds a threshold temperature, and wherein said first fail-safe mechanism is further arranged to connect the first input/output terminal to ground when an operate current through the first input/output terminal heats the first input/output terminal above the threshold temperature; and a second fail-safe mechanism adapted to connect the first and second input/output terminals to the ground terminal upon thermal destruction of the overvoltage protection device.

35. The communication line protection device of claim 34, wherein said first fail-safe mechanism comprises a first member, a second member, and a bond therebetween that releases above the threshold temperature, and wherein the first member includes a portion that is biased to move into a position connecting the first input/output terminal to the ground terminal when the bond releases.

* * * * *